US010638776B2

(12) United States Patent
Dieker et al.

(10) Patent No.: US 10,638,776 B2
(45) Date of Patent: May 5, 2020

(54) TEXTURIZED DAIRY PROTEINS AS CARBOHYDRATE SUBSTITUTE IN CARBOHYHDRATE-RICH FOOD ARTICLES

(71) Applicant: DMK Deutsches Milchkontor GmbH, Zeven (DE)

(72) Inventors: Veronika Dieker, Oldenburg (DE); Anne Buchholz, Georgsmarienhütte (DE); Ralf Zink, Bad Zwischenahn (DE)

(73) Assignee: DMK Deutsches Milchkontor GmbH, Zeven (DE)

( * ) Notice: Subject to any disclaimer, the term of this patent is extended or adjusted under 35 U.S.C. 154(b) by 244 days.

(21) Appl. No.: 15/815,084

(22) Filed: Nov. 16, 2017

(65) Prior Publication Data

US 2018/0168189 A1     Jun. 21, 2018

(30) Foreign Application Priority Data

Dec. 17, 2016 (EP) .................................... 16204903

(51) Int. Cl.
| | | |
|---|---|---|
| *A23J 3/26* | (2006.01) | |
| *A23J 3/10* | (2006.01) | |
| *A23J 3/14* | (2006.01) | |
| *A23P 30/20* | (2016.01) | |
| *A23P 30/34* | (2016.01) | |
| *A23J 3/22* | (2006.01) | |
| *A23C 21/08* | (2006.01) | |
| *A23J 3/16* | (2006.01) | |
| *A23L 7/10* | (2016.01) | |
| *A23L 11/00* | (2016.01) | |
| *A23J 3/08* | (2006.01) | |
| *A23L 35/00* | (2016.01) | |

(52) U.S. Cl.
CPC ............... *A23J 3/225* (2013.01); *A23C 21/08* (2013.01); *A23J 3/08* (2013.01); *A23J 3/10* (2013.01); *A23J 3/14* (2013.01); *A23J 3/16* (2013.01); *A23J 3/227* (2013.01); *A23J 3/26* (2013.01); *A23J 3/265* (2013.01); *A23L 7/115* (2016.08); *A23L 11/05* (2016.08); *A23L 35/00* (2016.08); *A23P 30/20* (2016.08); *A23P 30/34* (2016.08); *A23V 2002/00* (2013.01); *A23V 2250/548* (2013.01); *A23V 2250/54246* (2013.01); *A23V 2300/16* (2013.01)

(58) Field of Classification Search
CPC ........ A23J 3/10; A23J 3/14; A23J 3/16; A23J 3/26; A23J 3/225; A23J 3/265; A23P 30/20; A23P 30/34; A23L 7/115; A23L 11/05; A23C 21/08; A23V 2002/00; A23V 2002/225; A23V 2002/548; A23V 2002/54246; A23V 2300/16
See application file for complete search history.

(56) References Cited

U.S. PATENT DOCUMENTS

| | | | |
|---|---|---|---|
| 4,361,588 A * | 11/1982 | Herz ....................... | A23J 3/225 426/104 |
| 2003/0003194 A1 | 1/2003 | Roussel et al. | |
| 2004/0161519 A1 | 8/2004 | Walsh et al. | |
| 2004/0253363 A1 | 12/2004 | Nakano et al. | |
| 2005/0084578 A1* | 4/2005 | Onwulata ............... | A23J 3/265 426/516 |
| 2009/0263553 A1 | 10/2009 | Licker et al. | |
| 2009/0263565 A1 | 10/2009 | Ryder et al. | |
| 2012/0064209 A1 | 3/2012 | Ardisson-Korat et al. | |
| 2018/0368442 A1* | 12/2018 | Dieker .................... | A23J 3/225 |

* cited by examiner

*Primary Examiner* — Anthony J Weier
(74) *Attorney, Agent, or Firm* — Dilworth & Barrese, LLP

(57) ABSTRACT

A use of texturized dairy proteins is suggested, obtainable or obtained by providing
(a) a mixture, containing or consisting of
  (a1) about 25 to about 75% by weight dairy proteins, and
  (a2) about 75 to about 25% by weight a plant protein and/or a fibre material
  with the proviso that the quantities add up to 100% by weight,
(b) the mixture is extruded in the presence of water and/or whey, applying a temperature gradient of about 20 to about 200° C. and a pressure in the range of 1 to about 200 bar, and
(c) subsequently expanding the extrudate,
as a substitute for carbohydrates and as a source of protein in foods.

14 Claims, No Drawings

TEXTURIZED DAIRY PROTEINS AS CARBOHYDRATE SUBSTITUTE IN CARBOHYHDRATE-RICH FOOD ARTICLES

FIELD OF THE INVENTION

The invention is in the food sector and relates to the use of milk-based protein products which are characterized by special textures, as carbohydrate substitutes in foods which typically have a particularly high content of carbohydrates.

STATE OF THE ART

According to a study by the WTO from 2012 the global demand for food will at least double in the next 25 years. This challenge can only be met by a sustainable agriculture and the discovery of new food sources. Milk, which is particularly characterised by a high protein content, has a great potential for creating essential basic components of nutrition. Today, for example, milk and whey protein concentrates are already playing an important role in infant and toddler nutrition, and in comparison with plant proteins they are characterised in that they contain all essential amino acids in amounts that are sufficient for nutrition.

A sufficient supply of proteins is of fundamental importance for human nutrition. The German Association for Nutrition (Deutsche Gesellschaft für Ernährung—DGE) recommends that adults receive a daily protein supply of 0.8 g per kg of body weight. Children, teenagers, and particularly infants have a considerably higher demand. Senior citizens are often inadequately supplied with proteins. A protein uptake that is too low may lead to a degradation of the body's own protein with the result that all protein-controlled body functions are disturbed.

Against the background of an increasing amount of alternative food forms (e.g., vegan or vegetarian nutrition) which do not always ensure a sufficient protein supply—both with respect to the ingested amount and also with regard to the quality (i.e. uptake of essential amino acids)—alternative forms of protein uptake have been gaining significance.

Up to now, primarily, foods have been available on the market which have a high protein content per se and in which merely the source of protein was substituted. Typically, meat proteins are replaced with other proteins, mostly plant proteins. Typical meat substitute products on the basis of plant proteins or also chicken egg protein (e.g., vegetarian schnitzels) are currently in great demand. These products copy the sensory profile of the meat original to its full extent.

In addition, nowadays various food compositions are increasingly enriched with proteins in order to achieve health benefits, whereas before this had been exclusively intended for the nutrition of particular target groups (such as, e.g., athletes).

For quite some time, another trend towards a nutrition with less carbohydrates ("Low Carb") has been noticeable besides a trend towards reducing meat in one's nutrition: An increased uptake of carbohydrates is linked to a number of diseases of affluence such as obesity, diabetes, lipid metabolism disorders and cardiovascular disease. Low Carb nutrition focuses on minimising carbohydrates. In contrast to this, protein and fat rich foods can be eaten in an almost unlimited quantity in order to take up energy.

First steps have already been taken towards substituting carbohydrates in typical carbohydrate-based foods with protein raw materials (e.g., protein pasta, protein bread). Novel protein products which are reminiscent of typical carbohydrate-based foods could make an additional contribution to a better protein supply and increase the variety of food on offer. With a sufficient protein content, also the labelling of such foods as "source of protein" or "high protein content" would then be possible. According to currently applicable food law (Regulation (EC) No. 1924/2006 of the European Parliament and of the Council of 20 Dec. 2006 on nutrition and health claims made on foods—the so-called "Health Claims Regulation"), claims on protein contents may be made as follows:

A food may be labelled as a "source of protein" if the protein content represents at least 12% of the total energy value of the food.

A food may be labelled as having a "high protein content" if the protein content represents at least 20% of the total energy value of the food.

Various products are already known from the state of the art in which it is attempted to imitate a meat-like texture using whey proteins.

EP 1059040 B1 (BONGRAIN) describes a texturized product which is obtained by extruding milk or cheese. It specifically describes the process of feeding a raw material mixture containing whey proteins and water into an extruder, then heating it up to a temperature of initially 130° C. followed by a temperature of 200° C. in a zone-wise manner, with the pressure increasing from 0 up to a maximum of 50 bar. The extrudate is subsequently shaped and cooled. Inter alia, it also mentions a mixture containing whey proteins in combination with pea proteins and casein. These textured products characteristically form a network consisting of elongated fibres with a defined diameter while the fibres are forming branches having only about a tenth of their diameter.

For example, international patent application WO 2006 130025 A1 (FONTERRA) reports a process for the production of extruded dairy proteins for use in snack food products, wherein dairy proteins and starches are used as starting materials.

International patent application WO 2012 036910 A1 (FRITO LAY) also discloses snack food products obtained by processing dairy proteins in the presence of calcium carbonate under pressure, and then expanding them in a controlled manner.

The subject-matter of U.S. Pat. No. 6,607,777 B1 (UNIV UTAH) are dairy proteins with a meat-like texture, obtained by extrusion under pressure and subsequent expansion.

U.S. Pat. No. 8,642,109 B2 (SOLAE) claims soy protein nuggets, obtained by joint extrusion of soy proteins and carbohydrates.

The subject-matter of US 2004 161 519 A1 (WALSH) are texturized whey proteins used as a meat analogue, obtained by extrusion of whey proteins jointly with carbohydrates. With reference to example 1, examples 9 to 11 describe the texturization of a mixture of WPC80 and soy protein with added maize starch in a twin-screw extruder with water. The temperature at the outlet of the extruder increases linearly up to a temperature of 150° C., and the process is performed in the range from 50 to 500 psi. Subsequently, the extruded material is dried and milled to a powder.

Also the subject-matter of US 2004 253 363 A1 (NAKANO) are meat analogues which are obtained by means of extruding mixtures of plant and whey proteins. Example 1 describes a method of feeding a mixture of soy bean powder and WPC80 into an extruder together with water. The mixing ratio of protein to water is 20 kg/h:8 to 9 l/h. After exiting the extruder, the product was cut and dried to a residual water content of 10% by weight.

US 2009 263 553 A1 (LICKER) discloses texturized dairy proteins, obtained by extruding a mixture of 35% by weight caseinate, 5% by weight fibres and 34% by weight potato starch and 24.25% by weight tapioca starch at a water content from 28-34% by weight. The process is performed at a temperature gradient from 23-43° C. to 65-163° C. at a pressure from 68-96 bar. Subsequently, the extrudates were expanded and cut.

The subject matter of US 2009 263 565 A1 (RYDER) is the production of texturized protein masses which are substantially based on plant proteins and gluten. The mixture is extruded at no pressure and without the addition of water at a temperature gradient from 40 to 150° C.

However, it is disadvantageous that the processes only allow one texture at a time, which conflicts with the need to be able to imitate many different structures as possible in order to flexibly respond to the consumers' desire. A further considerable disadvantage is in that the processes of the state of the art appear to be unable to dispense with the use of additives, specifically of starch, as otherwise it is not possible to produce stable textures. In contrast to this, in the present invention it is expressly desired to keep the level of carbohydrates in the texturized products as low as possible, as the texturized proteins are used as a carbohydrate substitute in typical carbohydrate-based foods. In doing so, taste and mouth feel imitate known carbohydrate rich foods.

The task of the present invention was therefore to provide textures on the basis of dairy proteins, particularly whey proteins and/or caseins, which are suitable as carbohydrate substitutes which are capable of imitating the texture and the mouth feel of the most diverse foods depending on their use, coming as close as possible to the original when tasted.

DESCRIPTION OF THE INVENTION

The subject-matter of the invention is the use of texturized dairy proteins, also referred to as "Texturized Dairy Proteins" (TDP), obtainable or obtained by providing
(a) a mixture, containing or consisting of
    (a1) about 25 to about 75% by weight dairy proteins, and
    (a2) about 75 to about 25% by weight a plant protein and/or a fibre material
    with the proviso that the quantities add up to 100% by weight,
(b) the mixture is extruded in the presence of water and/or whey while applying a temperature gradient of about 20 to about 200° C. and a pressure in the range of 1 to about 200 bar, and
(c) subsequently expanding the extrudate,
as a substitute for carbohydrates and as a source of protein in foods.

Surprisingly, it was found that the carbohydrates in typical carbohydrate rich foods can be substituted by using the texturized dairy proteins produced by means of extrusion. The foods obtained have a high protein content and are almost impossible to be distinguished from the carbohydrate rich original product when tasted. In doing so, it showed that also texturized products with a meat-like texture are suitable for substituting carbohydrates in typical carbohydrate rich foods.

Starting Materials

Primary starting materials which are suitable for the production of texturized dairy proteins are described in the following. In each case, the preferred starting materials or ratios of starting materials lead to textures the use of which is also preferred according to the invention without referring to this again. Suitable primary starting materials (component a1) for TDP are dairy proteins, specifically, whey proteins (concentrates, isolates, hydrolysates) and caseins.

Whey proteins and casein represent the two most important protein fractions of the milk of mammals. In this case, the protein content of cow's milk of about 3.3% is composed of about 2.7% casein and about 0.6% whey protein. The designation whey protein is derived from the circumstance that the proteins of this fraction are the main component of the proteins found in whey. Whey proteins are a group of various albumins and globulins. Specifically, these are:
    alpha-lactalbumin ca. 20% (0.1% in milk)
    beta-lactoglobulin ca. 45% (0.25% in milk)
    immunoglobulins ca. 10%
    proteose peptone ca. 20%
    serum albumin ca. 5%

Whey proteins are heat-sensitive. When boiling milk, particularly β-lactoglobulin is responsible for the formation of the skin on the surface. Whey proteins also have a high content of branched-chain amino acids, such as about 20-25% of most food proteins. Whey proteins are classified as high-quality from a nutrition physiological aspect (high biological value). They are thus a main component of whey-based body-building supplements for muscle hypertrophy.

The simplest form of whey protein is present as whey protein concentrate. It is mainly produced by ultrafiltration. It has a higher protein content of about 70 to 80%. Due to the ease of production of the raw material in the dairies it is substantially less costly than whey protein isolate and whey protein hydrolysate. Suppliers of dietary supplements therefore consider it their first choice when producing their products. On account of a carbohydrate level of about 6 to 8% and a fat level of about 4 to 7% by weight, the protein content is slightly lower than in the case of isolate.

Two different processes are employed in the production of whey protein isolate. In the ion exchange process, the whey proteins are adsorbed and eluated at the ion exchanger, as a result of which the protein preparations contain more salts. No salts are used in the production of whey protein isolate by means of a microfiltration process. In doing so, a particularly high purity can be achieved with a protein level of about 90 to 96% and a low fat and lactose content of less than one percent. Further, whey protein isolate is particularly suitable for people with lactose intolerance, because it is practically lactose-free.

The process of hydrolysis is applied in the production of whey protein hydrolysate. By means of hydrolysis (cleavage) of the protein chains into smallest fragments (peptides), the body is capable of resorbing whey protein hydrolysate more quickly. The higher the degree of hydrolysis, the more valuable and more expensive is the protein. A disadvantage worth mentioning is the bitter taste. Whey protein hydrolysate is therefore mainly used in amino acid tablets and capsules, where the bitter taste only plays a subordinate role. Whey protein hydrolysate is added to mixtures of various high-value proteins (multi-component proteins) in small portions.

Casein also represents a mixture of several proteins (αS1-, αS2-, β-, κ-casein) and is used for storing as well as transporting protein, calcium, and phosphate to the newborn. In the milk, casein forms micelles, together with calcium phosphate and other components. Typical examples of suitable casein comprise both caseins obtained by acid treatment (also referred to as caseinates) and micellar casein obtained by microfiltration of skimmed milk.

In the course of the invention it was observed that for a texturization of the products it is crucial to perform the extrusion together with plant proteins that are providing texture to the products that in a sensory aspect is typical for poultry, fish, mushrooms, tofu, or also peanut flips. Beyond that, it may be advantageous to add plant fibres for product texture. Such fibrous materials may be part of plant-based protein concentrates. Alternatively, fibres may be added as a raw material separately (e.g., when using plant protein isolates). Beyond that, the folding of the protein structure of these plant-based proteins has also proved to be very advantageous when providing products with texture.

Usually, component (a2) is used in a proportion of about 25 to about 75% by weight, preferably, about 30 to about 60% by weight, and particularly about 40 to about 50% by weight, based on the total amount of components (a1) and (a2).

Extrusion and Shaping

The following describes the production of the texturized dairy proteins. In each case, the preferred process conditions lead to textures the use of which according to the invention is also preferred without referring to this again. When extruding protein/fibre mixtures, it is indispensable to always use water and/or whey concomitantly.

The formation of different textures depends on the operating conditions of the extruder. Preferably, the mixtures of (a1) dairy proteins and (a2) plant-based proteins or fibres are extruded while applying a temperature gradient from about 40° C. to about 170° C., and a pressure gradient which is adjusted from 1 bar to about 120 bar.

The amount of fluid in the extrusion process is also important for the formation of different textures. More particularly, the so-called "low moisture" and "high moisture" processes are distinguished.

Low Moisture Process

In the first case, the mixtures are extruded in the presence of water and/or whey of about 10 to about 50% by weight and, particularly, about 20 to about 40% by weight, based on the total amount of the raw materials used, i.e. the amount of components (a1+a2) and water or whey. Extrusion is performed under pressure which, particularly, results from the parameters of engine speed and temperature and which is adjusted to about 30 to 120 bar and, particularly, to about 50 to 110 bar. Extrusion is preferably performed in a twin-screw extruder having parallel shear-intensive screws.

In addition, extrusion takes place while applying a temperature gradient of about 20 to about 200° C. and, particularly, about 40 to about 170° C. This means that the extruder, which has an exterior heating/cooling jacket and a number of separately controllable temperature zones, has a lower temperature in the front region than it has in the rear part. A great difference of pressure and temperature between the interior of the extruder and the environment facilitates the expansion of the extrudates obtained after their exiting the extruder.

Depending on the equipment, engine speeds are to be set from about 200 to about 2,000 rpm. Herein, casein or caseinates are preferred starting materials with regard to components (a1) dairy proteins.

A typical method for processing products according to the low moisture process consists in expanding them to normal pressure in one step after their exiting the extruder, and converting the resulting mass into a chunky shape. At the moment of exiting the extruder, the product still has a temperature of about 120 to about 140° C., which leads to an almost complete evaporation of the water or the water content of the whey. The product expands and assumes a texture which is best compared to that of peanut flips. The mass can be processed by means of a shaping nozzle, followed by a cutting device. In comparison to starch-based extrudates, the products are characterised in that they retain their form after placing them into water. Optionally, a post-treatment of the products produced according to the described process may be performed by means of post-drying.

High Moisture Process

In the second case, the mixtures are extruded in the presence of water and/or whey of about 50 to about 75% by weight and, particularly, about 55 to about 60% by weight, based on the total amount of the raw materials used, i.e. the amount of components (a1+a2) and water or whey. Again, extrusion is performed under pressure which, particularly, results from the parameters of engine speed and temperature, and which is adjusted to about 5 to 50 bar and, particularly, to about 10 to 30 bar. Also in this case, extrusion is preferably performed in a twin-screw extruder having parallel shear-intensive screws.

In addition, extrusion also takes place while applying a temperature gradient of about 20 to about 200° C. and, particularly, about 40 to about 170° C. It is mandatory in this case that the course of temperature is not linear but that the temperature is increasing to its highest point between the front and the central part of the extruder before decreasing again at its end. For example, such a profile may have the following course: increase from 20-40° C. to 160-200° C. (in the centre of the extruder) and decrease (at the outlet of the extruder) to 100-140° C. A profile of this kind provides particularly stable and uniform textures.

As the products have an increased water content, viscosity during processing is lower than in the low moisture process. Depending on the equipment, engine speeds are to be set from about 200 to about 2,000 rpm. Also in this case, extrusion can be performed with whey or a mixture of water and whey instead of water. Whey proteins are here the preferred starting materials with regard to components (a1) dairy proteins.

Also the types of cooling, expansion and further processing may have an influence on texture. In the simplest case, the products are expanded at the air or in a cooling bath after exiting the extruder.

Preferably, however, the mixtures are guided into a cooling channel after exiting the extruder, maintaining their pressure, so that according to this manner the cooled mass exits at normal pressure. A cooling channel is to be understood as being a simple component, which, for example, consists of a tube with a cooled exterior jacket. The extrusion mass is fed in at one end and exits the cooling channel at the other end where it is restored to ambient pressure. Typically, the cooling channel has a constant diameter over its whole length. The length and the diameter of the cooling channel depend both on the size of the extruder and the resulting product throughput. Using a cooling channel is a contributory factor for the buildup of some textures, because when the extrusion mixture is conveyed through the tube cooling takes place from the outside to the inside of the mass, in the process of which a particularly fibrous structure is obtained.

The cooled mass still has a temperature of about 50 to 80° C. at the outlet and is subsequently converted into a chunky shape, for example, by portioning the strand of texturized product by knives. For further texturizing it is then recommended to subject the masses to at least one of the two following measures:
(I) deep freezing and thawing, and/or
(Ii) boiling in stock.
Both measures serve to loosen the structure.

INDUSTRIAL APPLICATION

The amount of texturized dairy proteins in the foods is uncritical and may be, in principle, between 1 and 99% by weight. It depends on what the typical proportion of carbohydrates is in the foods, which may be substituted wholly or in part. The texturized dairy proteins of the present invention according to the low moisture process or the high moisture process are both suitable for use in such foods which, regarding their nutritional value, particularly contain carbohydrates in great quantities. Depending on the food preparation method and the texture it is preferred to use texturized products that are produced according to any one of the two process variants.

Typical examples of food preparations which typically have a high carbohydrate content and in which the products of the present invention may be used, comprise bread products, pasta products, vegetable dishes, specifically potato dishes, rice dishes, but also sweet products such as cakes, puddings, casseroles and the like.

EXAMPLES

Example 1

72% by weight of a dry mixture, consisting of 32% by weight casein (acid casein, at least 95% protein in the dry matter) and 68% by weight soy protein concentrate (at least 67% protein in the dry matter) with 28% by weight water was fed to a twin-screw extruder consisting of 10 separate housing units (zone 1: non-tempered; zone 2-10: individually temperature-controllable) with an applied temperature gradient ranging from 40 to 170° C. The mixture was conveyed at an engine speed of 300 rpm, in the process of which a pressure of about 50 bar built up in the extruder. The mass, which was still about 130° C. hot and plastic, was continually conveyed out of the extruder and immediately guided over a perforated plate (bore of 4 mm diameter) and rotating knives, and converted into a chunky shape. In this process, the product expanded to ambient pressure, in the process of which the water evaporated to a low residual moisture, strongly puffing the resulting mass. The throughput was ca. 50 kg/h. A protein texture similar to that of peanut flips was obtained, which was characterised by a dimensional and textural stability in water.

Example 2

45% by weight of a dry mixture, consisting of 72% by weight whey protein concentrate (at least 80% protein in the dry matter) and 14% by weight soy protein concentrate (at least 67% protein in the dry matter) and 14% by weight pea protein isolate (at least 84% protein in the dry matter) with 55% by weight water was fed to a twin-screw extruder, consisting of 10 separate housing units (zone 1: not tempered; zone 2-10: individually temperature-controllable) with an applied temperature gradient in the range from 20 to 200° C. The mixture was conveyed at an engine speed of about 600 rpm, in the process of which a pressure of about 20 to 30 bar built up in the extruder. Without expansion, the product was conveyed into a cooling channel which was surrounded by a cooling jacket. The cooling channel was a component about 1 m long with a rectangular cross section (height: 1.3 cm; width 4.9 cm). The temperature of the cooling jacket was adjusted to 30° C. via a separate cooling aggregate. The extruded mass was continuously conveyed from the cooling channel with a throughput of about 14 kg/h and expanded to ambient pressure. The 70° C. hot compressed strand was portioned with knives and then, after cooling, these portions were deep-frozen to −18° C.

Example 3

"Protein Dumplings" with Texturized Dairy Proteins (Production of the Texturized Products According to the Low Moisture Process)

Variant 1: Savoury.

Soak 60 g TDP according to example 1 in plenty of water (ratio at least 1:5) for ca. 20 hours. Leave texturized products to drain in a sieve and squeeze out in a perforated cloth. Crush the TDP in a Thermomix food processor (level 5; 5 s). Knead crushed TDP, 1 egg, 1.5 g instant vegetable stock and 0.5 g salt with a hand mixer to form a mass. Fill the mass into suitable cooking bags (ca. 50-75 g mass per cooking bag), compact them, and close the bags airtight. Slightly perforate the filled bags with a needle. Allow the dumplings to simmer in boiling salt water for ca. 12-15 minutes (core temperature 80° C.) until ready. Put the dumplings quickly under a stream of cold water and remove them from the bags. The dumplings may be served, for example, with a roast and gravy as an alternative to bread or potato dumplings.

Variant 2: Sweet.

Soak 60 g TDP according to example 1 in plenty of water (ratio at least 1:5) for ca. 20 hours. Leave texturized products to drain in a sieve and squeeze out in a perforated cloth. Crush the TDP in a Thermomix food processor (level 5; 5 s). Knead crushed TDP, 1 egg, 30 g sugar, 7 g vanilla sugar and a pinch of cinnamon powder with a hand mixer to form a mass. Fill the mass into suitable cooking bags (ca. 50-75 g mass per cooking bag), compact them, and close the bags airtight. Slightly perforate the filled bags with a needle. Allow the dumplings to simmer in boiling salt water for ca. 12-15 minutes (core temperature 80° C.) until ready. Put the dumplings quickly under a stream of cold water and remove them from the bags. Enjoy the dumplings similarly to apricot dumplings for dessert or as a sweet meal.

Example 4

"Protein Porridge" with Texturized Dairy Proteins (Production of the Texturized Products According to the Low Moisture Process)

Soak 45 g TDP according to example 1 in plenty of water (ratio at least 1:5) for ca. 20 hours. Leave texturized products to drain in a sieve and squeeze out in a perforated cloth. Crush the TDP in a Thermomix food processor (level 5; 3 s). Process crushed TDP, 100 g milk and 15 g cocoa powder beverage in a Thermomix food processor at level 3 at a temperature of 80° C. for 3 minutes to a protein porridge.

Example 5

Protein Vegetable Patties with Texturized Dairy Proteins (Production of the Texturized Products According to the Low Moisture Process or the High Moisture Process)

Knead 30 g TDP according to example 1 (soaked in water for ca. 20 h, drained and squeezed, then crushed) or 2 (boiled in stock and then crushed), 2 spring onions, 70 g mung bean sprouts (drained net weight, canned product), 50 g grated cheese (e.g., Gouda), 1 egg, 0.7 g salt, 0.7 g freshly ground black pepper, 0.7 g ground oregano to a mass. Form patties similar to burger patties from the mass. Fry the patties from both sides in some rapeseed oil in a pan.

Example 6

"Protein Potato Chips or French Fries" with Texturized Dairy Proteins (Production of the Texturized Products According to the Low Moisture Process)

Soak TDP according to example 1 in plenty of liquid (ratio at least 1:5) for ca. 20 hours. Suitable liquids are, for example, fruit juice, cooled coffee or water. Subsequently, leave TDP to drain well in a sieve. To add taste, dip the TDP lightly in condiments or seasoning mixtures (e.g., seasoning for French fries, paprika, cinnamon). Set the TDP on a baking tray lined with baking paper and bake for 5 minutes in a pre-heated oven at a temperature of 200° C. top heat and base heat. The protein "French fries" may be served with a sweet or savoury dip.

Example 7

Sweet Nuggets with Texturized Dairy Proteins (Production of the Texturized Products According to the Low Moisture Process or the High Moisture Process)

Preparation of a protein binding agent: prepare a dry mixture of 50 g whey protein concentrate, 12 g pregelatinized wheat flour, 12 g skimmed milk powder, 9 g sugar, 15 g vanillin sugar and 12 g potato starch (cold swelling). Stir the dry mixture into 115 g water.

Variant 1

(Production of the texturized products according to example 1—low moisture process): Soak 60 g TDP according to example 1 in plenty of water or fruit juice (ratio at least 1:5) for ca. 20 hours. Subsequently, leave texturized products to drain in a sieve and squeeze out in a perforated cloth. Blend the texturized products with the protein binding agent and dip in bread crumbs. Form nuggets from the mass. Subsequently, pre-fry the nuggets in hot oil in the deep fryer initially for 50 s. Fry the nuggets again in hot oil for 50 s directly before consumption. Alternatively, preparation may be carried out in a pan. To this end, fry the nuggets in some rapeseed oil from both sides until golden brown.

Variant 2

(Production of the texturized products according to example 2—high moisture process): Boil 200 g TVP according to example 2 in boiling water (lightly salted) for 7 to 10 minutes. Punch corresponding nugget shapes from the strands (industrial mode: forming by forming machines). Dip them shortly into the binder solution and then dip them in bread crumbs (industrial mode: dry breading equipment). Then pre-fry the nuggets in hot oil in the deep fryer initially for 50 s. Fry the nuggets again in hot oil for 50 s directly before consumption. Alternatively, it is also possible to crush the texturized products (for example, by means of a kitchen machine) and to bond them with the protein binding agent. Then process as described above. As an alternative to deep-frying, preparation of the nuggets may also be carried out in a pan. To this end, fry the nuggets in some rapeseed oil from both sides until golden brown.

Example 8

Tiramisu (Production of the Texturized Products According to the Low Moisture Process)

Blend 500 g mascarpone, 150 ml milk, 70 g sugar, 8 g vanillin sugar, 40 ml amaretto with a hand mixer to a smooth mass. Soak 60 g TDP according to example 1 in 450 ml cold coffee overnight (ca. 15 to 20 hours). On the next day, leave texturized products to drain well and distribute half of the texturized products in a deep bowl. Spread half of the mascarpone cream on top of it. Repeat this kind of layering once. Put the tiramisu into the fridge for at least 3 hours. Dust with cocoa powder before serving.

Example 9

No Bake Cake/Gateau Base (Production of the Texturized Products According to the Low Moisture Process)

Soak 100 g TDP according to example 1 in plenty of water or another liquid (ca. 3 l) overnight (ca. 15-20 h). Leave TDP to drain on the next day and squeeze out by means of a perforated cloth. Crush the TDP in a Thermomix food processor (level 7; 5 s). Then add 70 g soft butter and blend with the TDP (step 3; 1 min). Line a springform pan (diameter: (26-28 cm) with baking paper. Distribute buttered dough crumbs on the bottom, pressing them firmly onto the bottom. Allow cake/gateau bottom to cool in the fridge for at least 1 h. Then add a cream and/or fruit layer to the bottom as desired. Allow the cake to cool until serving.

Example 10

Protein Pasta (Production of the Texturized Products According to the High Moisture Process)

Cut 200 g TDP of example 2 with a low-waste peeler into fine strips. Boil the protein strips in plenty of salted, boiling water for 5 minutes. Serve the pasta with a sauce.

Example 11

Milk Pancakes (Production of the Texturized Products According to the Low Moisture Process or the High Moisture Process)

Soak 85 g TDP according to example 1 in 500 g apple juice (for at least 5 h). Leave TDP to drain and crush with 300 g TDP according to example 2 (chunky) in a Thermomix food processor (level 7; 6 s). Blend TDP with 250 g low-fat quark, 40 g sugar, 1 egg, 45 g whey protein concentrate and 1 pinch of salt and stir well. Form small oval pancakes from the mass. Fry the pancakes on both sides in some rapeseed oil.

Example 12

Sweet Casserole (Production of the Texturized Products According to the Low Moisture Process)

Soak 85 g TDP according to example 1 in 500 g apple juice (for at least 5 h). Leave TDP to drain; crunch in the Thermomix food processor (level 7; 4 s). Blend TDP with 250 g low-fat quark, 30 g sugar, 1 egg and 1 pinch of salt. Fill the mass into small fireproof casserole forms and bake in a pre-heated oven at a temperature of 200° C. top heat and base heat for 15 minutes.

The invention claimed is:
1. A pasta or bread product comprising texturized dairy protein, obtained by providing
 (a) a mixture, consisting of
  (a1) about 25 to about 75% by weight dairy proteins, and
  (a2) about 75 to about 25% by weight of a fibre material and/or plant protein, with the proviso that the quantities of (a1) and (a2) add up to 100% by weight,
 (b) extruding the mixture in the presence of water or whey wherein the proteins are extruded while applying a non-linear temperature gradient starting at a temperature of about 20 to 40° C. at the inlet via a peak temperature of about 160 to 200° C. in the centre, and a decline to about 100 to 140° C. at the outlet of the extruder and a pressure in the range of 1 to about 200 bar, and (c) subsequently expanding the extrudate.

2. The pasta or bread product of claim 1, wherein component (a1) is represented by dairy proteins, whey proteins and/or casein or caseinates.

3. The pasta or bread product of claim 1, wherein component (a2) is represented by plant-based proteins and/or plant fibres.

4. The pasta or bread product of claim 1, wherein the mixtures of (a1) dairy proteins and (a2) fibres or plant proteins are extruded in the presence of about 10 to about 50% by weight water and/or whey based on the total quantity of components (a1+a2) and water or whey.

5. The pasta or bread product of claim 1, wherein casein and/or caseinates are used as component (a1).

6. The pasta or bread product of claim 1, wherein the mixtures of (a1) dairy proteins and (a2) fibres or plant proteins are extruded in the presence of about 50 to about 75% by weight water and/or whey based on the total quantity of components (a1+a2) and water and/or whey.

7. The pasta or bread product of claim 6, wherein whey proteins are used as component (a1).

8. The pasta or bread product of claim 1, wherein the mixtures of (a1) dairy proteins and (a2) fibres or plant proteins are extruded while applying a pressure gradient, leading from about 1 bar to about 5 to 200 bar.

9. The pasta or bread product of claim 1, wherein the texturized dairy protein is expanded in one step to atmospheric pressure after exiting the extruder, and converted into a chunky shape.

10. The pasta or bread product of claim 1, wherein the texturized dairy protein is expanded in a cooling bath after exiting the extruder.

11. The pasta or bread product of claim 1, wherein the texturized dairy protein is passed into a cooling channel under pressure after exiting the extruder, and unloaded at normal pressure.

12. The pasta or bread product of claim 1, wherein the texturized dairy protein after cooling and expanding is either
    (a) converted into a chunky shape, are deep-frozen and subsequently thawed again, or
    (b) converted into a chunky shape and subsequently boiled in stock.

13. The pasta or bread product of claim 1, wherein the texturized dairy protein is used in quantities of 1 to 99% by weight, based on the pasta or bread product.

14. A pasta or bread product consisting of texturized dairy protein, obtained by providing
    (a) a mixture, consisting of
        (a1) about 25 to about 75% by weight dairy proteins, and
        (a2) about 75 to about 25% by weight of a fibre material and/or plant protein, with the proviso that the quantities of (a1) and (a2) add up to 100% by weight,
    (b) extruding the mixture in the presence of water or whey wherein the proteins are extruded while applying a non-linear temperature gradient starting at a temperature of about 20 to 40° C. at the inlet via a peak temperature of about 160 to 200° C. in the centre, and a decline to about 100 to 140° C. at the outlet of the extruder and a pressure in the range of 1 to about 200 bar, and
    (c) subsequently expanding the extrudate.

* * * * *